United States Patent
Kim

(10) Patent No.: US 11,285,785 B2
(45) Date of Patent: Mar. 29, 2022

(54) AIR VENT FOR AUTOMOBILE

(71) Applicant: NIFCO KOREA INC., Asan-si (KR)

(72) Inventor: Seong Keon Kim, Yongin-si (KR)

(73) Assignee: NIFCO KOREA INC., Chungcheongnam-Do (KR)

( * ) Notice: Subject to any disclaimer, the term of this patent is extended or adjusted under 35 U.S.C. 154(b) by 348 days.

(21) Appl. No.: 16/570,068

(22) Filed: Sep. 13, 2019

(65) Prior Publication Data

US 2020/0094656 A1    Mar. 26, 2020

(30) Foreign Application Priority Data

Sep. 20, 2018 (KR) .................. 10-2018-0113267

(51) Int. Cl.
*B60H 1/34* (2006.01)

(52) U.S. Cl.
CPC .................. *B60H 1/3421* (2013.01)

(58) Field of Classification Search
CPC combination set(s) only.
See application file for complete search history.

(56) References Cited

U.S. PATENT DOCUMENTS

| 6,059,652 | A | 5/2000 | Terry et al. |
| 6,131,336 | A | 10/2000 | Krause et al. |
| 9,370,986 | B2 | 6/2016 | Londiche et al. |
| 10,625,575 | B2 | 4/2020 | Lee et al. |
| 2015/0210143 | A1 | 7/2015 | Schlippe |
| 2015/0239325 | A1 | 8/2015 | Londiche et al. |
| 2017/0021701 | A1* | 1/2017 | Belzons ............... B60H 1/3421 |
| 2018/0170153 | A1 | 6/2018 | Lee et al. |
| 2018/0283729 | A1* | 10/2018 | Terasawa ............ F24F 13/1426 |
| 2019/0061476 | A1* | 2/2019 | Isobe .................... F24F 13/075 |
| 2019/0351744 | A1* | 11/2019 | Lee ........................ F24F 11/89 |

FOREIGN PATENT DOCUMENTS

| DE | 19728305 A1 | 1/1999 |
| DE | 102014203511 B3 | 4/2015 |
| KR | 101283132 B1 | 7/2013 |
| KR | 2015-0091006 A | 8/2015 |
| KR | 1020180072186 A | 6/2018 |

OTHER PUBLICATIONS

Korean Notice of Allowance issued for Korean Patent Application No. 10-2018-0113267 dated Jan. 21, 2020.

* cited by examiner

*Primary Examiner* — Steven B McAllister
*Assistant Examiner* — Elizabeth M. May
(74) *Attorney, Agent, or Firm* — Thomas Horstemeyer, LLP

(57) ABSTRACT

An air vent for an automobile comprises a duct in which a passage having an air inlet and an air outlet communicating with each other is formed; a duct cover fixed to a front surface of the duct; a knob mount fixed to a front surface of the duct cover; a knob installed in the knob mount and configured to be laterally movable; a nozzle installed in a direction of the air outlet of the duct and configured to be vertically rotatable; a front vane connected to the nozzle and configured to be laterally rotatable; a damper plate having one side end portion connected to the nozzle and an other side end portion to be moved along a guide groove formed in the duct; and a damper configured to be rotatable to open or close the passage.

7 Claims, 11 Drawing Sheets

AIR VENT FOR AUTOMOBILE

CROSS-REFERENCE TO RELATED APPLICATION

This application is based upon and claims the benefit of priority from Korean Patent Application No. 10-2018-0113267, filed on Sep. 20, 2018, the entire contents of which are incorporated herein by reference.

TECHNICAL FIELD

The present disclosure relates to an air vent for an automobile.

BACKGROUND

Automobiles may be considered as necessities of life for modern people, and thus, the number of users of automobiles is growing exponentially.

As a result, drivers who use automobiles tend to show great interest in not only basic types of automobile performance such as driving comfort, riding comfort, speed, and stability, but also use convenience and efficiency.

In particular, an internal environment of an automobile related to cooling and heating greatly influences the driving efficiency of a driver, and efficiency maximization of cooling and heating is very important in terms of fuel efficiency of the automobile.

An air vent used in the automobile is used in an automobile air conditioner. The air conditioner is installed at an automobile's inner side end portion of a housing to provide cool/hot air currents generated from an evaporator and a heater to an inside of the automobile.

An air vent for an automobile is known to be configured such that a plurality of vanes are rotatably installed in an air outlet of a main body to adjust a direction of air discharged into an automobile or to open/close the air outlet of the main body.

An example of such an air vent for an automobile is disclosed in Korean Patent Publication No. 10-2015-0091006 (published Aug. 7, 2015) or the like.

However, since such an air vent requires a large space in which the plurality of vanes are installed, there are many limitations on an installation space. Since a separate vane link should be provided in order for a wind direction to be vertically adjustable, it is difficult to reduce a size of the air vent for an automobile. Therefore, when designing an interior of the automobile, it is impossible to create a desired design.

PRIOR ART DOCUMENT

Patent Document

Korean Patent Publication No. 10-2015-0091006 (published Aug. 7, 2015)

SUMMARY

Various embodiments of the present disclosure provide an air vent for an automobile that adjusts a wind direction by a nozzle and a damper plate when a knob is manipulated in a vertical direction (in upward and downward directions), wherein the air vent has a front vane that is connected to an inner side of the nozzle and the damper plate has one side end portion connected to the nozzle and the other side end portion moving along a guide groove formed in a duct. Therefore, an installation space and a manipulation space of the air vent are minimized, a shape of the air vent becomes slim, and a size of the air vent is reduced, thereby freely installing the air vent inside an automobile without limitations on an installation space and easily allowing an interior of the automobile to have a desired design.

An air vent for an automobile according to one embodiment of the present disclosure includes a duct 100 in which a passage having an air inlet and an air outlet communicating with each other is formed; a duct cover 200 fixed to a front surface of the duct 100; a knob mount 300 fixed to a front surface of the duct cover 200; a knob 400 installed in the knob mount 300 and configured to be laterally movable; a nozzle 500 installed in a direction of the air outlet of the duct 100 and configured to be vertically rotatable; a front vane 510 connected to an inner side of the nozzle 500 and configured to be laterally rotatable according to a lateral movement amount of the knob 400 such that a lateral wind direction is adjustable; a damper plate 600 installed inside the duct, the damper plate having one side end portion connected to the nozzle 500 and an other side end portion to be moved along a guide groove 101 formed in the duct 100; and a damper 700 installed in a direction of the air inlet of the duct 100 and configured to be rotatable to open or close the passage.

In one embodiment, the knob is further configured to be vertically rotatable, and the air vent may further include a knob rotation shaft 800 installed between the nozzle 500 and the knob mount 300; a knob pin 520 coupled to a middle portion of the knob rotation shaft 800, wherein a front end of the knob pin 520 passes through the knob mount 300 and is coupled to the knob 400; and a knob link 530 configured to move in response to vertical and lateral movements of the knob 400 and to be laterally moved, wherein one side end portion of the knob link 530 is connected to a rear portion of the knob pin 520, and the front vane 510 includes a front vane shaft 511 to which an other side end portion of the knob link 530 is connected.

In one embodiment, a guide groove 531 having an inverted "L" shape may be formed in the other side end portion of the knob link 530.

In one embodiment, the air vent may further include a knob rotation shaft 800 which the damper 700 is connected to one side end portion of; and a damper device 900 through which the damper 700 is connected to the one side end portion of the knob rotation shaft 800.

In one embodiment, the damper device 900 may include a cam pin 910 fixed to the one side end portion of the knob rotation shaft 800; a cam 920 in which a guide groove 921 is formed to be inclined such that a portion of the cam pin 910 is moved while being guided, and a damper rod 930 including one side end portion connected to the cam 920 and an other side end portion connected to the damper 700.

In one embodiment, the air vent may further include a damper device 900 through which the damper 700 is connected to one side end portion of the knob rotation shaft 800. The middle portion of the knob rotation shaft 800 to which the knob pin 520 is coupled may be formed in an angled shape, and the one side end portion of the knob rotation shaft 800 to which the damper device 900 is connected may be formed in a circular shape.

In one embodiment, the duct 100 may include a rear duct 110 and a front duct 120 which are coupled to each other.

In one embodiment, a movement groove 310 may pass through the knob mount 300 to allow the knob pin 520 coupled to the knob 400 to be laterally movable only within a certain range.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Embodiments of the present disclosure are illustrated for the purpose of explaining the technical idea of the present disclosure. The scope of the rights according to the present disclosure is not limited to the embodiments presented below or the detailed descriptions of such embodiments.

All the technical terms and scientific terms in the present disclosure include meanings or definitions that are commonly understood by those of ordinary skill in the art unless otherwise defined. All terms in the present disclosure are selected for the purpose of describing the present disclosure more clearly, and are not selected to limit the scope of the present disclosure.

As used in the present disclosure, expressions such as "comprising", "including", "having", and the like are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will be also applied to the singular expressions recited in the claims.

In the present disclosure, the description that one element is "connected," "coupled," and "fixed" to another element should be appreciated to indicate that one element may be directly connected, coupled, or fixed, to another element, and should be further understood that a new element may be interposed between one element and another element.

Figure 1:
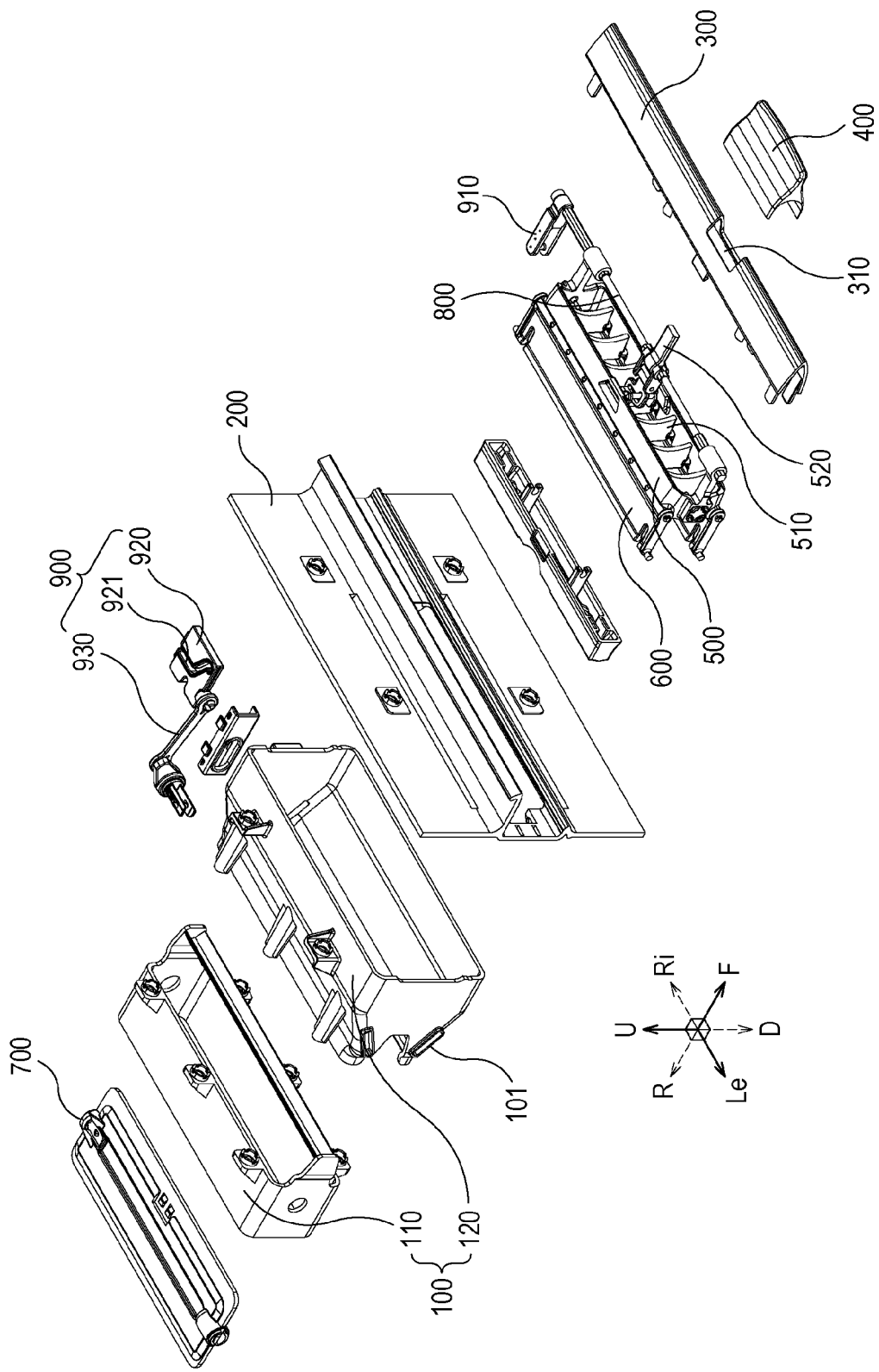
FIG. 1 is an exploded perspective view showing a configuration of an air vent for an automobile according to the present disclosure.
Figure 2:
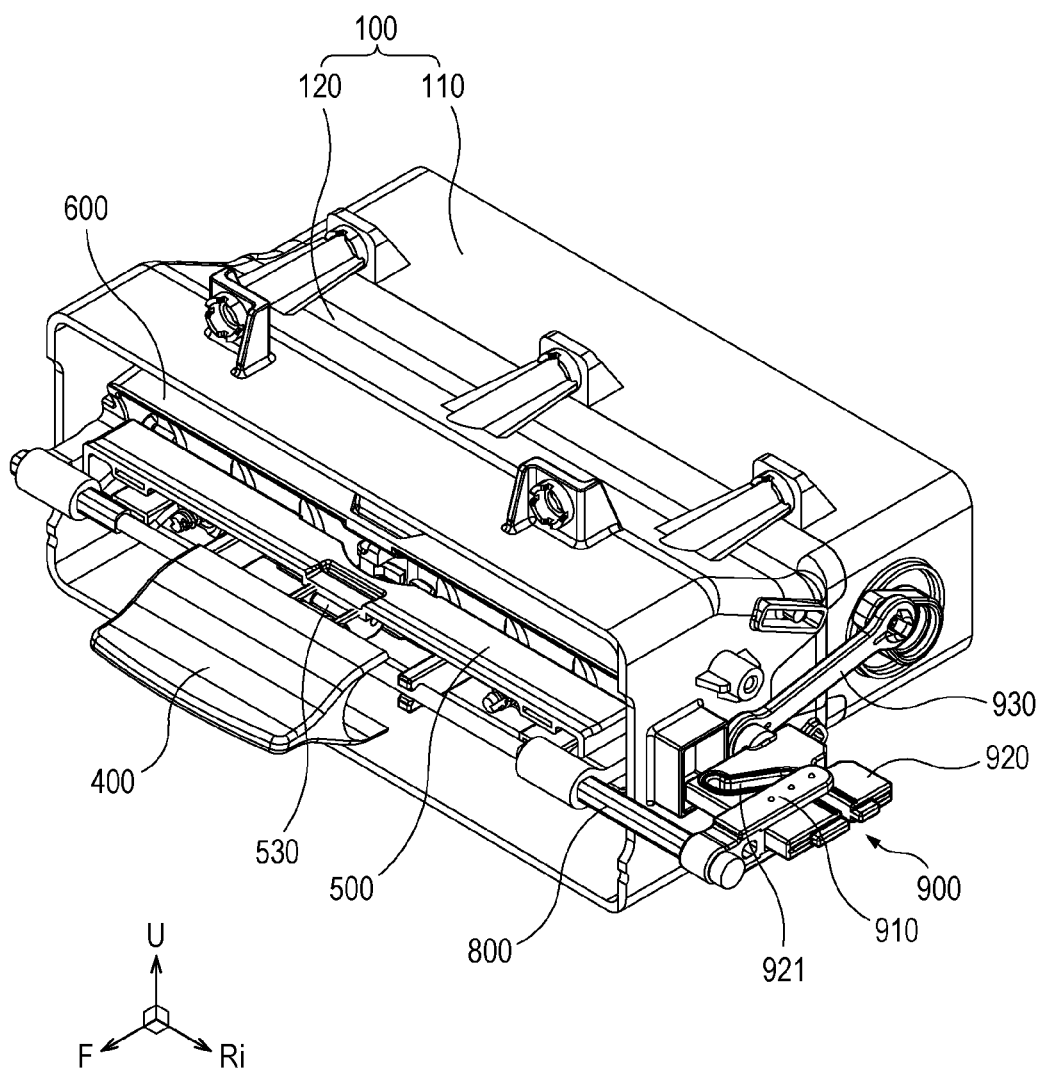
FIG. 2 is a perspective view showing the air vent for an automobile omitting a duct cover 200 and a knob mount 300.
Figure 3:
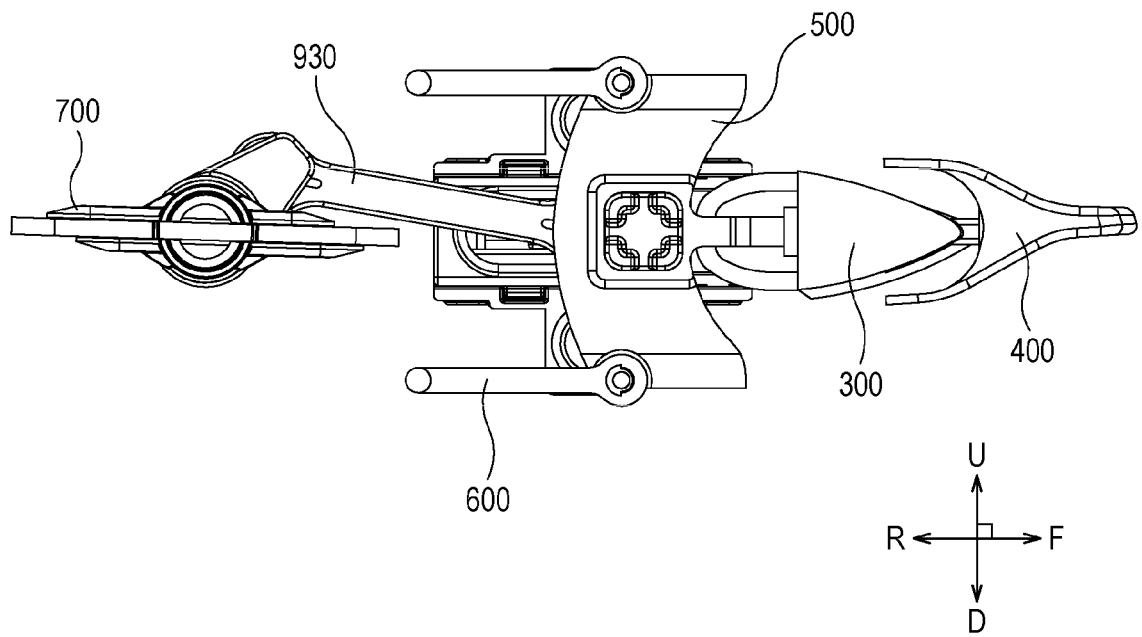
FIG. 3 is a use state view showing a state in which the air vent for an automobile is manipulated to discharge air forward.
Figure 4:
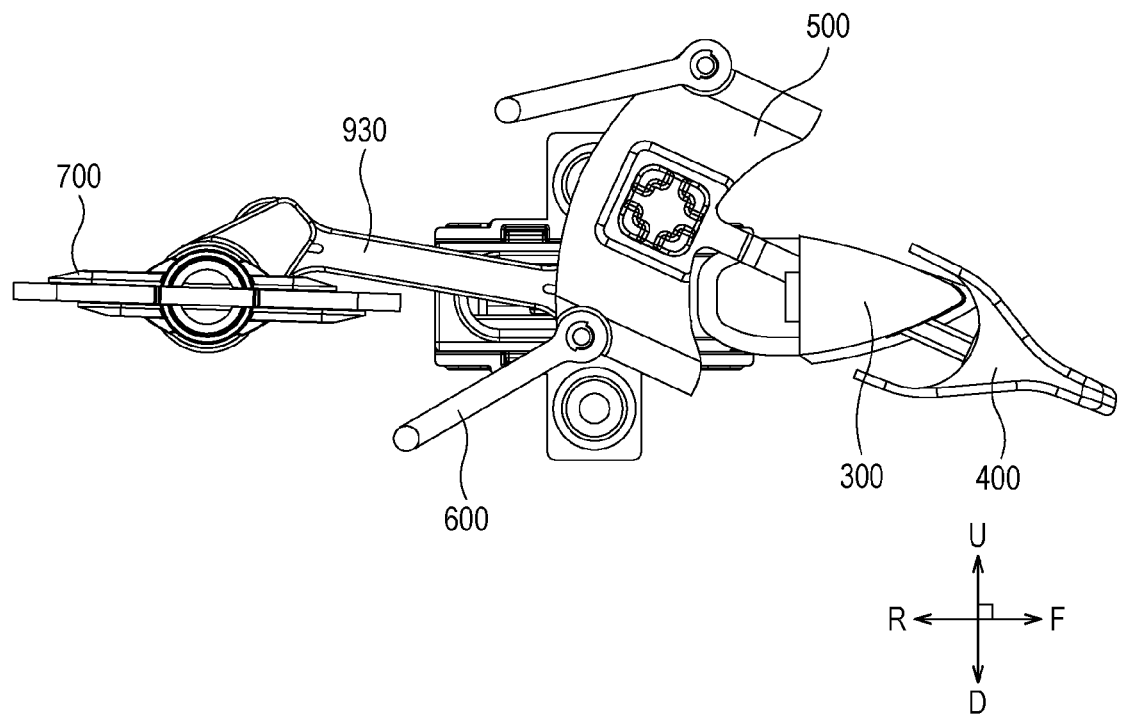
FIG. 4 is a use state view showing a state in which the air vent for an automobile is manipulated to discharge air downward.
Figure 5:
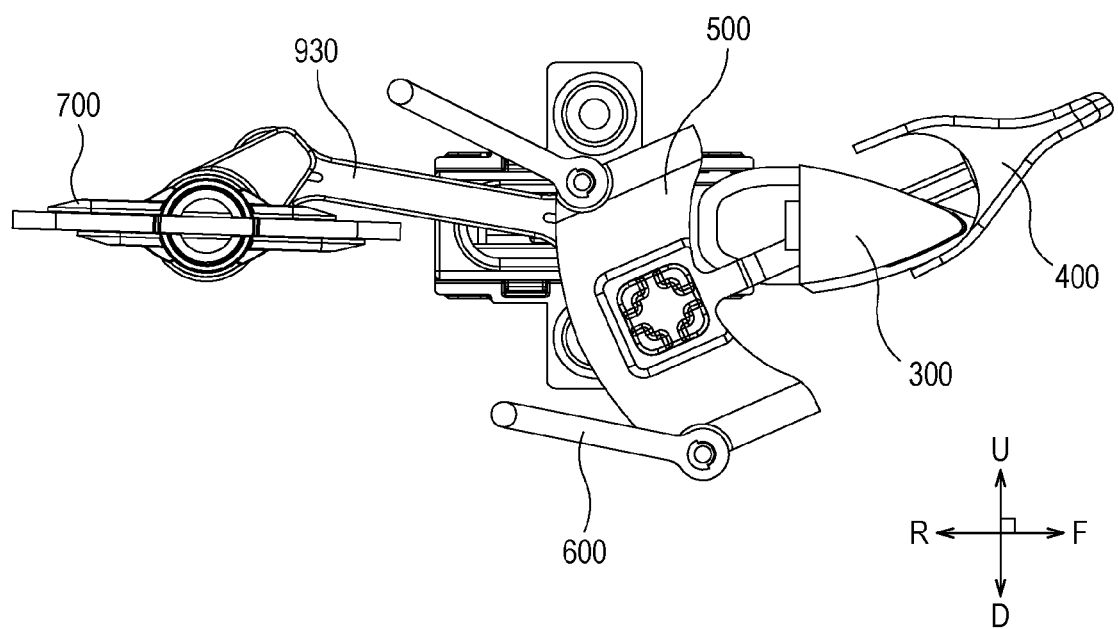
FIG. 5 is a use state view showing a state in which the air vent for an automobile is manipulated to discharge air upward.
Figure 6:
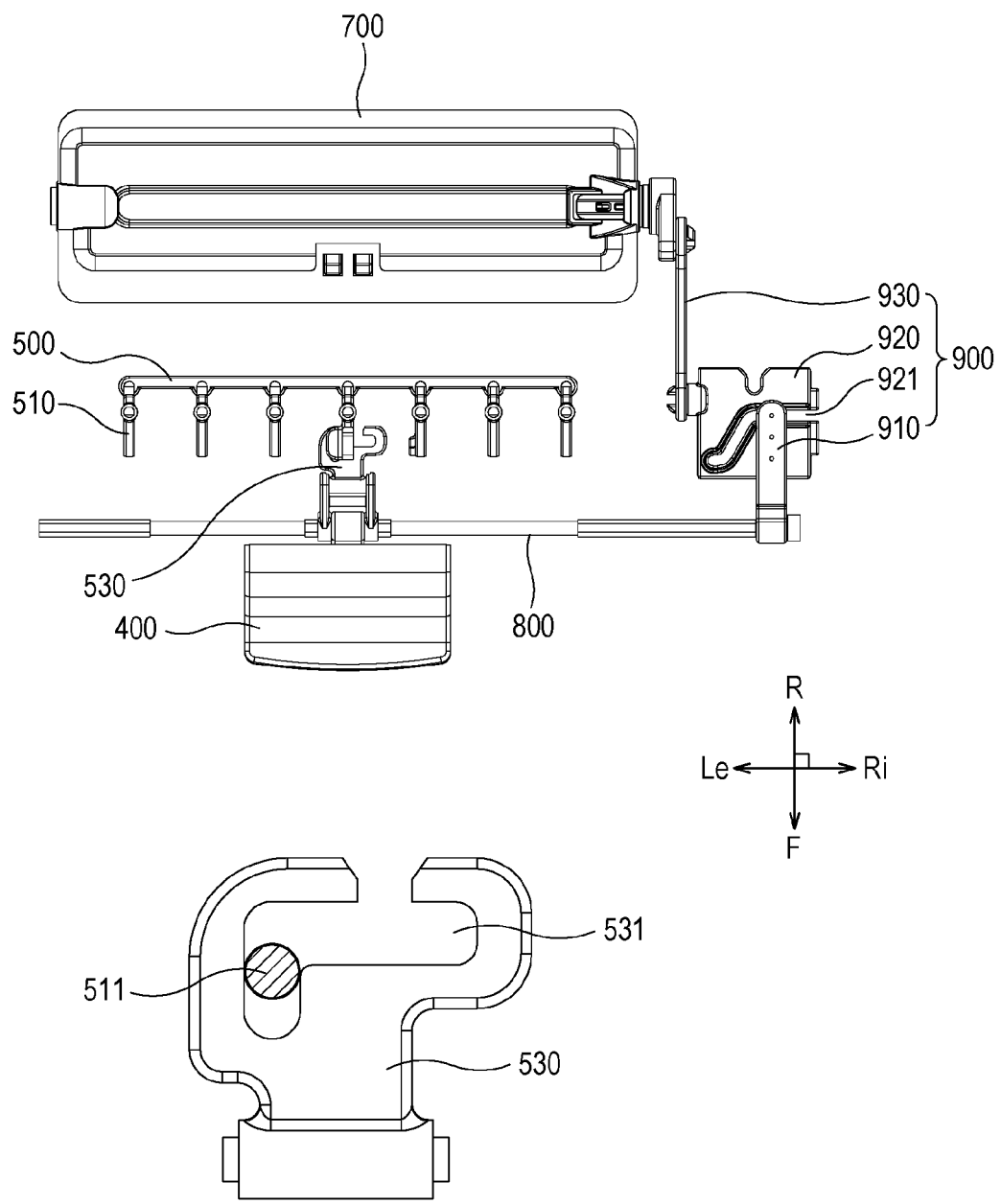
FIG. 6 is an operation state view showing a state in which a front vane shaft is positioned in a guide groove of a knob link so that the air vent for an automobile discharges air forward.
Figure 7:
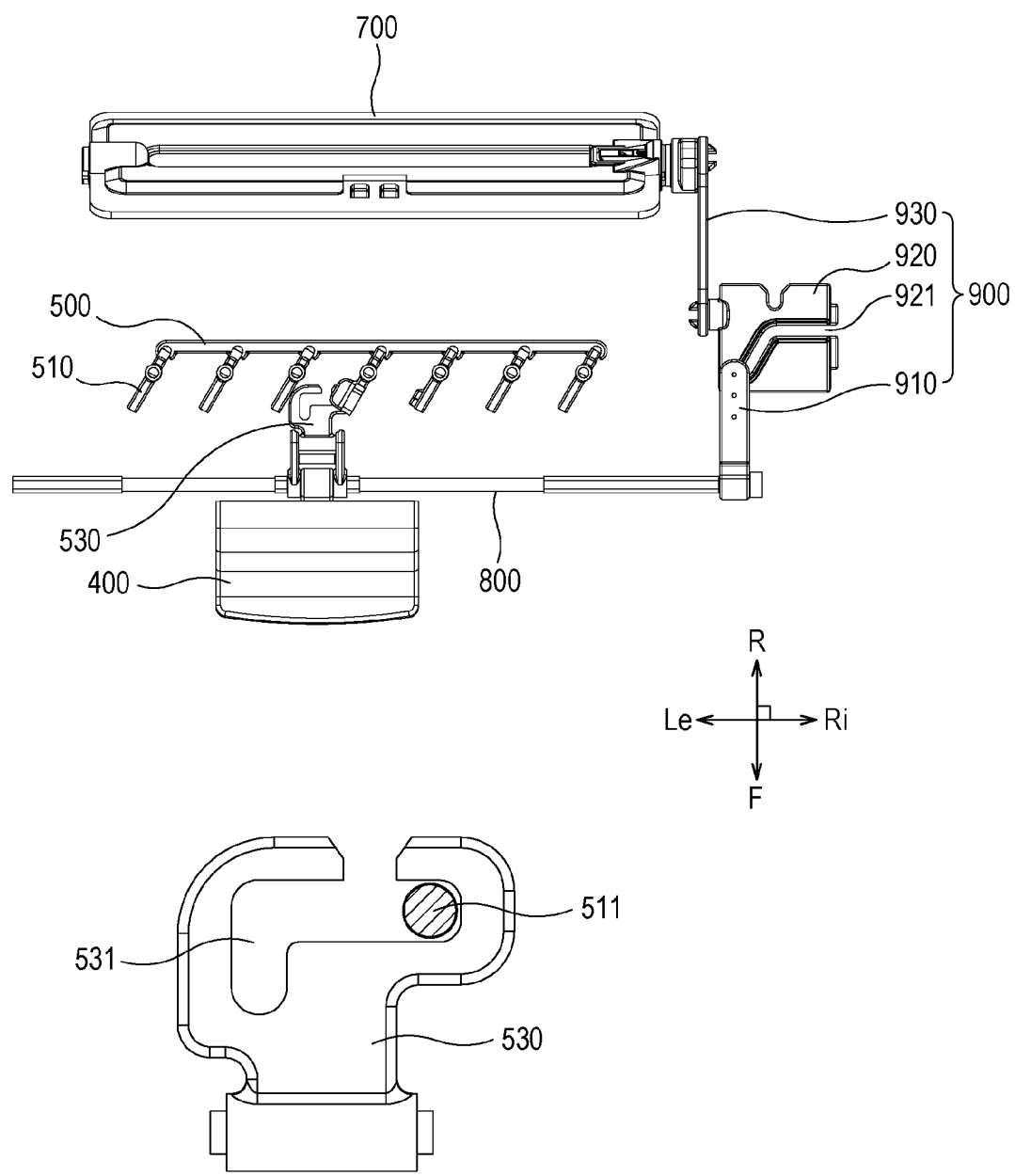
FIG. 7 is an operation state view showing a state in which the front vane shaft is positioned in the guide groove of the knob link so that a damper is operated at the same time as the air vent for an automobile discharges air to the left.
Figure 8:
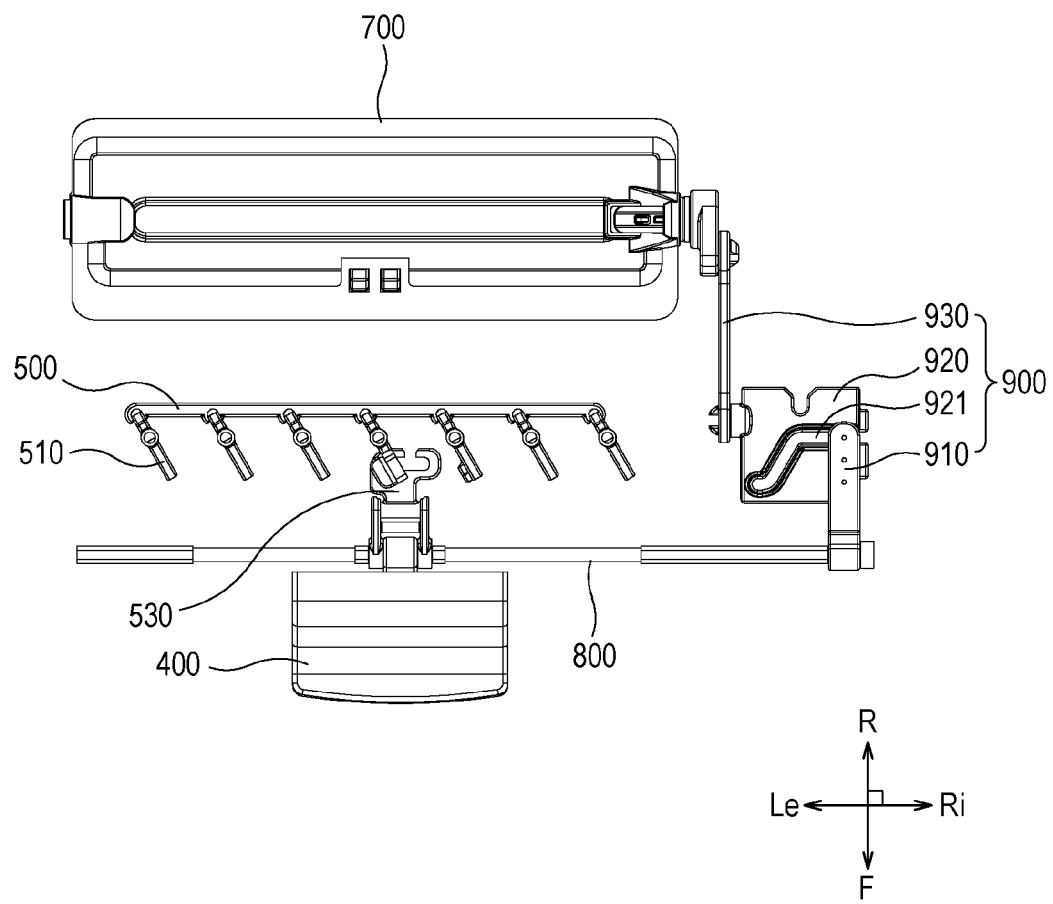
FIG. 8 is an operation state view showing a state in which the front vane shaft is positioned in the guide groove of the knob link so that the air vent for an automobile discharges air to the right.
Figure 8:
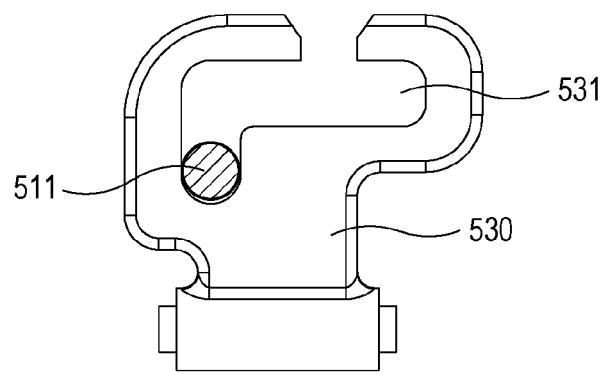
Figure 9:
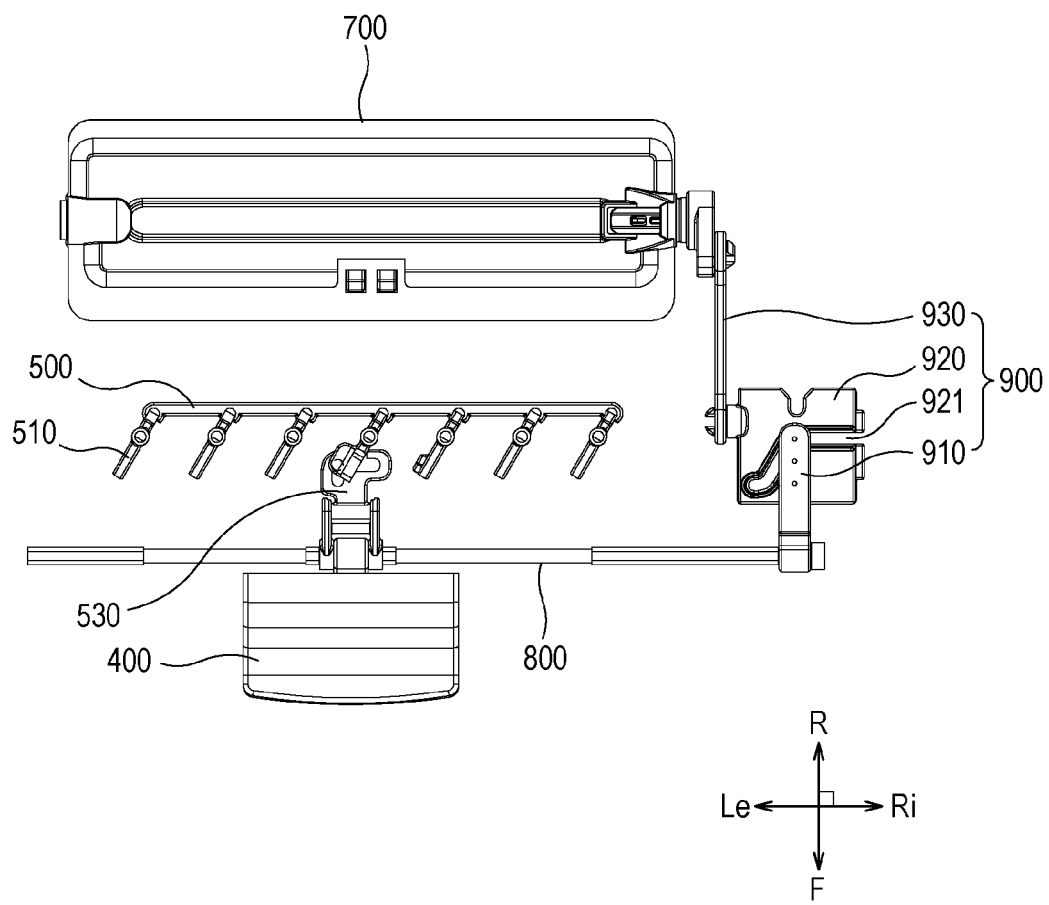
FIG. 9 is an operation state view showing a state in which the front vane shaft is positioned in the guide groove of the knob link so that the air vent for an automobile according to the present disclosure discharges air to the left.
Figure 9:
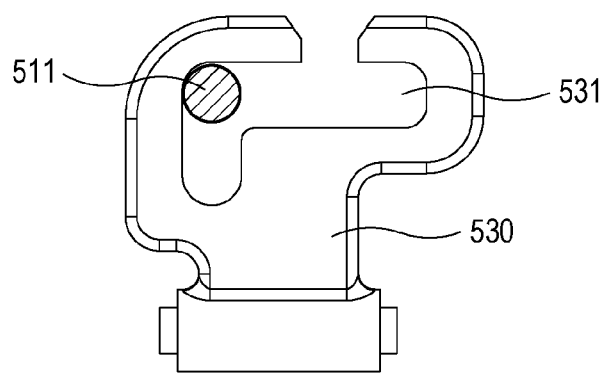
Figure 10:
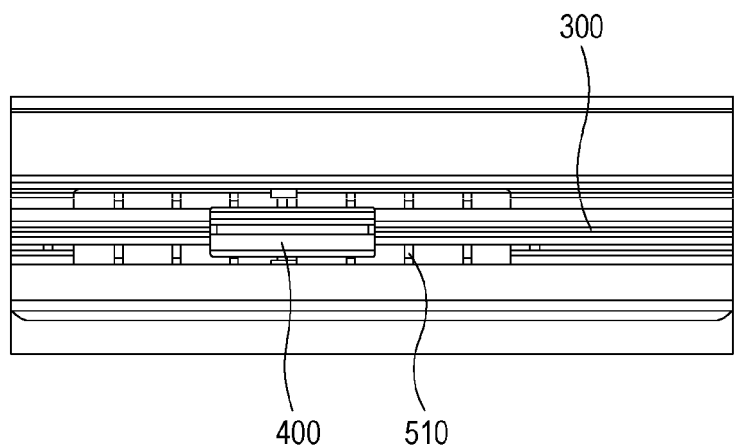
FIG. 10 is a front view showing the air vent for an automobile.
Figure 11:
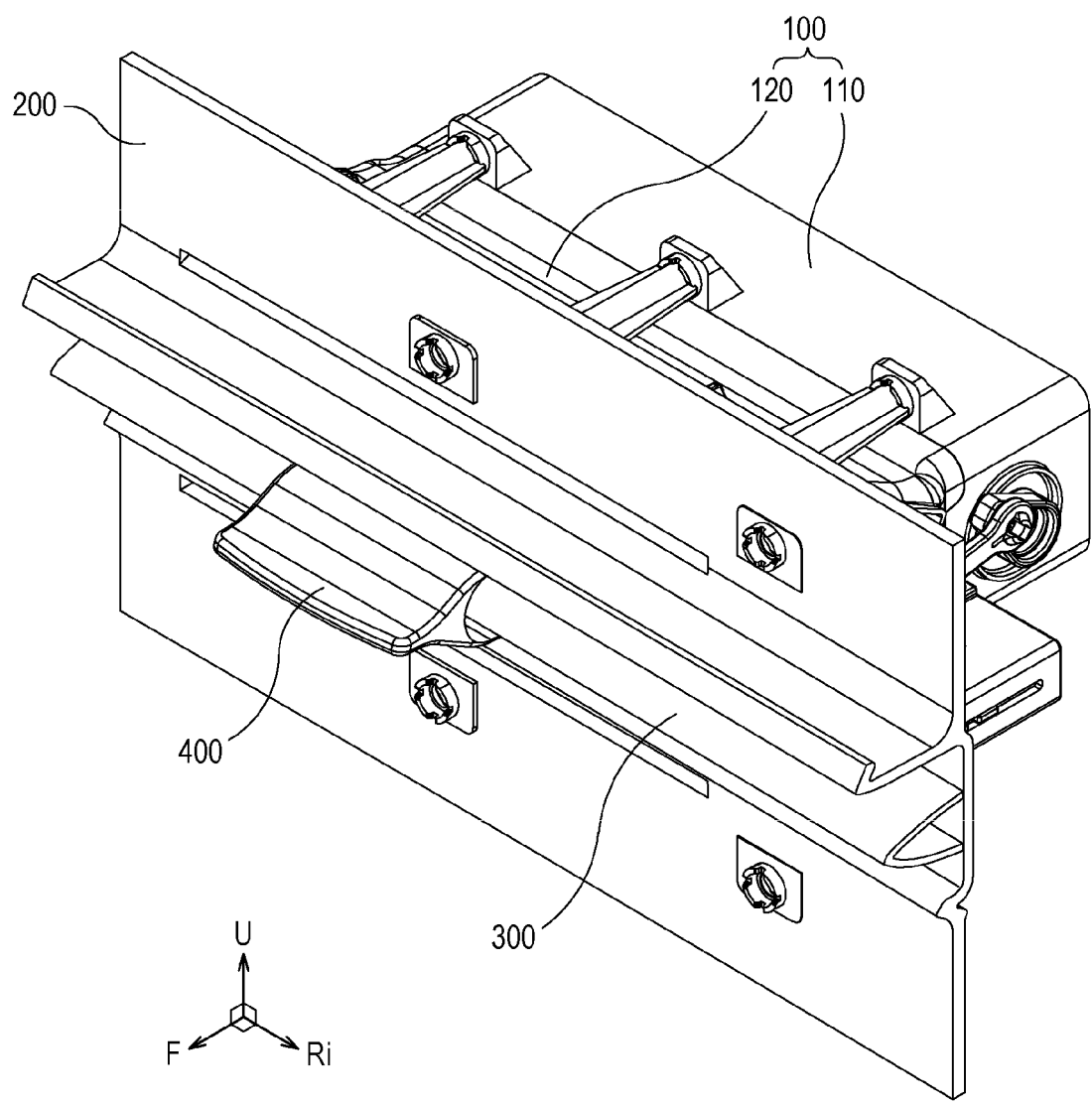
FIG. 11 is a perspective view showing the air vent for an automobile including the duct cover 200 and a knob mount 300.
Figure 12:
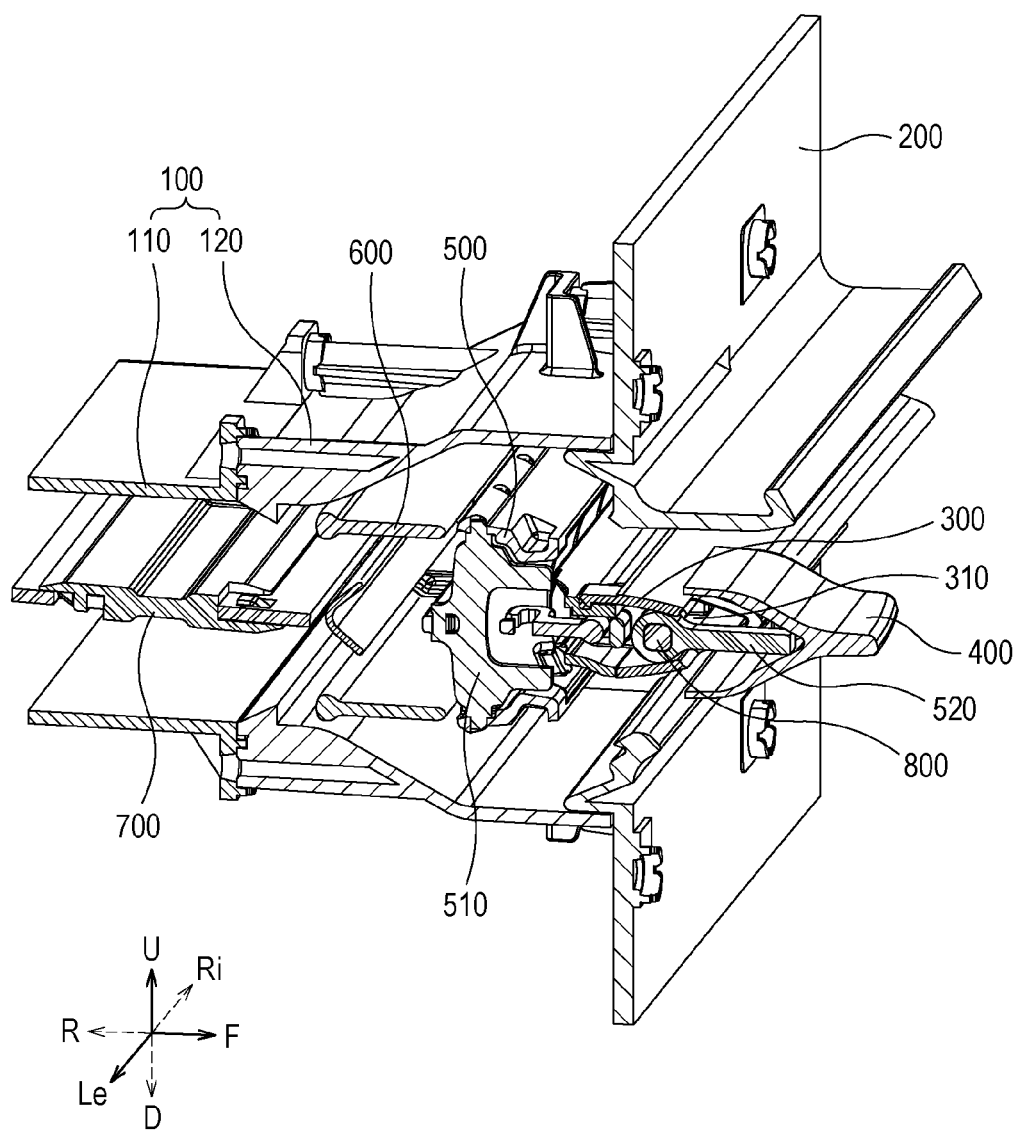
FIG. 12 is a perspective section view showing the air vent for an automobile.

FIG. 1 is an exploded perspective view showing a configuration of an air vent for an automobile according to the present disclosure. FIG. 2 is a perspective view showing the air vent for an automobile. FIG. 3 is a use state view showing a state in which the air vent for an automobile is manipulated to discharge air forward. FIG. 4 is a use state view showing a state in which the air vent for an automobile is manipulated to discharge air downward. FIG. 5 is a use state view showing a state in which the air vent for an automobile is manipulated to discharge air upward. FIG. 6 is an operation state view showing a state in which a front vane shaft is positioned in a guide groove of a knob link so that the air vent for an automobile discharges air forward. FIG. 7 is an operation state view showing a state in which the front vane shaft is positioned in the guide groove of the knob link so that a damper is operated at the same time as the air vent for an automobile discharges air to the left. FIG. 8 is an operation state view showing a state in which the front vane shaft is positioned in the guide groove of the knob link so that the air vent for an automobile discharges air to the right. FIG. 9 is an operation state view showing a state in which the front vane shaft is positioned in the guide groove of the knob link so that the air vent for an automobile discharges air to the left. FIG. 10 is a front view showing the air vent for an automobile. FIG. 11 is a perspective view showing the air vent for an automobile including the duct cover 200 and a knob mount 300. FIG. 12 is a perspective section view showing the air vent for an automobile.

Expressions referring to directions such as "front (F)/rear (R)/left (Le)/right (Ri)/upper (U)/lower (D)" mentioned below are defined based on the illustrations in FIGS. 1 to 10, but this is merely given to describe the present disclosure for clear understanding thereof, and it goes without saying that the respective directions may be defined differently depending on where the reference is placed.

As shown in FIGS. 1 to 12, the air vent for an automobile according to the present disclosure includes a duct 100 in which a passage having an air inlet and an air outlet communicating with each other is formed. The air vent includes a duct cover 200 fixedly coupled to a front surface of the duct 100. The air vent includes a knob mount 300 fixedly coupled to a front surface of the duct cover 200. The air vent includes a knob 400 installed in the knob mount 300 and configured to be laterally movable (movable in leftward Le and rightward Ri directions). The air vent includes a nozzle 500 installed in a direction of the air outlet of the duct 100 and configured to be vertically rotatable (rotatable in upward U and downward D directions). The air vent includes a front vane 510 connected to an inner side of the nozzle 500. The front vane 510 is configured to be laterally rotatable (rotatable in the leftward and rightward directions) according to a lateral movement amount (a movement amount in the leftward and rightward directions) of the knob 400 such that a lateral wind direction is adjustable. The air vent includes a damper plate 600 installed in the duct 100. The damper plate 600 is installed inside the duct 100. The damper plate 600 has one side end portion connected to the nozzle 500 and the other side end portion to be moved along a guide groove 101 formed in the duct 100. The air vent includes a damper 700 installed in a direction of the air inlet of the duct 100. The damper 700 is configured to be rotatable to open or close the passage.

A knob rotation shaft 800 is installed between the nozzle 500 and the knob mount 300. A knob pin 520 is coupled to a middle portion of the knob rotation shaft 800. A front end of the knob pin 520 passes through the knob mount 300. The front end of the knob pin 520 is coupled to the knob 400. A knob link 530 is configured to move in response to vertical and lateral movements (movements in upward, downward, leftward and rightward directions) of the knob 400. The knob link 530 is configured to be laterally movable (move in the leftward and rightward directions). The knob link 530 is connected to a front vane shaft 511 of the front vane 510. One side end portion of the knob link 530 is connected to a rear portion of the knob pin 520, and the other side end portion of the knob link 530 is connected to the front vane shaft 511. The front vane shaft 511 vertically passes through the knob link 530.

In addition, a guide groove 531 having an inverted "L" shape is formed in the other side end portion of the knob link 530 connected to the front vane shaft 511. The front vane shaft 511 of the front vane 510 may be guided along the guide groove 531. The front vane shaft 511 may be configured to rotate so that a wind direction is laterally adjusted. The front vane shaft 511 may be configured to vertically rotate the damper plate 600 and the nozzle 500 to adjust a vertical wind direction.

The guide groove 531 includes a portion having a shape extending in a lateral direction (in the leftward and rightward directions) and a portion having a shape extending in front and rear directions. A rear end of the portion having the shape extending in the front and rear directions is connected to one end of the portion having the shape extending in the lateral direction. In the present embodiment, the rear end of the portion having the shape extending in the front and rear directions is connected to a left end of the portion having the shape extending in the lateral direction.

The damper 700 is connected to one side end portion of a knob rotation shaft 800. The damper 700 and one side end portion of the knob rotation shaft 800 are connected to each other through a damper device 900. The damper 700 may be configured to be rotated according to a lateral movement amount of the knob rotation shaft 800 to open or close the passage. The damper device 900 may be configured such that the damper 700 is rotated according to a lateral movement amount of the knob rotation shaft 800.

In addition, the damper device 900 includes a cam pin 910 fixedly coupled to the one side end portion of the knob rotation shaft 800. The damper device 900 includes a cam 920 in which a guide groove 921 is formed to be inclined such that a portion of the cam pin 910 is moved while being guided. The damper device 900 includes a damper rod 930 including one side end portion connected to the cam 920 and the other side end portion connected to the damper 700. The guide groove 921 is configured such that one end portion of the cam pin 910 is moved while being guided. A rear end portion of the cam pin 910 may be moved along the guide groove 921.

The middle portion of the knob rotation shaft 800 to which the knob pin 520 is coupled has a cross section (a cross section perpendicular to the lateral direction) formed in an angled shape. The one side end portion of the knob rotation shaft 800 to which the damper device 900 is connected has a cross section (a cross section perpendicular to the lateral direction) formed in a circular shape. The angled shape may be a polygonal shape (for example, a quadrangular shape). Thereby, a vertical manipulation force of the knob 400 can be smoothly transmitted to the nozzle 500 and the damper plate 600 through the knob rotation shaft 800 when the vertical manipulation force is transmitted to the knob rotation shaft 800 from the knob 400, and a horizontal manipulation force of the knob 400 can be efficiently transmitted to the damper 700 such that the passage of the duct 700 is opened or closed when the horizontal manipulation force is transmitted to the knob rotation shaft 800 from the knob 400.

In addition, the duct 100 includes a rear duct 110 and a front duct 120 which are coupled to each other. Thereby, the damper plate 600, the nozzle 500, and the damper 700 can be easily installed in the passage formed in the duct 100 to be operable.

A movement groove 310 is formed to pass through the knob mount 300 to allow the knob pin 520 coupled to the knob 400 to be laterally movable only within a certain range. The knob 400 is not moved by a distance that is greater than a lateral length of the movement groove 310. The movement groove 310 is formed to pass through the knob mount 300 in the front-rear direction. The movement groove 310 prevents the knob pin 520 from being laterally moved beyond the certain range.

According to the present disclosure as configured above, when an occupant in an automobile moves the knob 400 in one side or the other side (in a left side or a right side) direction of the knob mount 300 to adjust a wind direction, as shown in FIGS. 8 and 9, the front vane shaft 511 of the front vane 510 installed in the nozzle 500 is moved while being guided along the guide groove 531 formed in the knob link 530. Thus, as the front vane 510 is laterally rotated, a lateral wind direction is adjusted.

As shown in FIGS. 3 and 6, when the knob 400 is positioned at a center of the movement groove 310, the front vane shaft 511 of the front vane 510 installed in the nozzle 500 is moved while being guided along the guide groove 531 formed in the knob link 530. Thus, as the front vane 510 is rotated, air is discharged to the center.

As shown in FIGS. 1 and 7, when the knob 400 is moved in a left direction such that the knob pin 520 comes into contact with a left portion of the movement groove 310 formed in the knob mount 300, as shown in FIG. 7, the knob rotation shaft 800 is moved in the left direction, and the cam pin 910 is moved along the guide groove 921 formed in the cam 920 by a movement amount by which the knob rotation shaft 800 is moved in the left direction. Thus, the cam 920 is moved backward. Therefore, as the damper rod 930 rotates the damper 700 while being moved backward by a movement amount by which the cam 920 is moved backward, an inflow amount of air flowing through the air inlet of the duct 100 is adjusted.

In order to discharge air in an upper or lower direction inside an automobile through the nozzle 500, as shown in FIGS. 1, 4, and 5, when an occupant in the automobile rotates the knob 400 in the upper or lower direction, a rotational force of the knob 400 is transmitted to the nozzle 500 through the knob rotation shaft 800 formed in the angled shape. At the same time, as the damper plate 600, of which one side end portion is connected to the nozzle 500, is also moved along the guide groove 101 of the duct 100 by an amount by which the nozzle 500 is rotated by the rotational force transmitted through the knob rotation shaft 800, the damper plate 600 is inclined. Thus, as air introduced into the passage of the duct 100 through the air inlet is guided due to the damper plate 600 that is inclined, the air is discharged in an inward direction of the automobile through upper and lower portions of the air outlet.

According to the present disclosure, when a knob is manipulated, as a nozzle is moved in a vertical direction of a passage of a duct and a wind direction is guided through a damper plate by a movement amount by which the nozzle is moved, air is supplied to the inside of an automobile through an air outlet formed in the duct. Thus, even when the size of an air vent is reduced, a sufficient amount of air can be supplied to an interior.

According to the present disclosure, even when the size of an air vent is reduced, a sufficient amount of air can be supplied to an interior of an automobile. Thus, when the air vent is installed in an automobile, the air vent can be freely installed in the interior of the automobile without limitations on an installation space, and the interior of the automobile can be easily designed in a desired design.

Although the present disclosure has been described in relation to some embodiments, it should be noted that there may be various modifications and changes without departing from the spirit and scope of the present disclosure, which can be understood by those skilled in the art. In addition, such modifications and changes should be construed as belonging to the scope of the claims appended herein.

What is claimed is:

1. An air vent for an automobile, comprising:
   a duct in which a passage having an air inlet and an air outlet communicating with each other is formed;
   a duct cover fixed to a front surface of the duct;
   a knob mount fixed to a front surface of the duct cover;
   a knob installed in the knob mount and configured to be laterally movable and to be vertically rotatable;
   a nozzle installed in a direction of the air outlet of the duct and configured to be vertically rotatable;
   a front vane connected to an inner side of the nozzle and configured to be laterally rotatable according to a lateral movement amount of the knob such that a lateral wind direction is adjustable;
   a damper plate installed inside the duct, the damper plate having one side end portion connected to the nozzle and an other side end portion to be moved along a guide groove formed in the duct;
   a damper installed in a direction of the air inlet of the duct and configured to be rotatable to open or close the passage,
   a knob rotation shaft installed between the nozzle and the knob mount;
   a knob pin coupled to a middle portion of the knob rotation shaft, wherein a front end of the knob pin passes through the knob mount and is coupled to the knob; and
   a knob link configured to move in response to vertical and lateral movements of the knob and to be laterally movable, wherein one side end portion of the knob link is connected to a rear portion of the knob pin, and the front vane includes a front vane shaft to which an other side end portion of the knob link is connected.

2. The air vent of claim 1, wherein a guide groove having an inverted L shape is formed in the other side end portion of the knob link.

3. The air vent of claim 1, further comprising:
   a damper device through which the damper is connected to one side end portion of the knob rotation shaft,
   wherein the damper is connected to the one side end portion of the knob rotation shaft.

4. The air vent of claim 3, wherein the damper device comprises:
   a cam pin fixed to the one side end portion of the knob rotation shaft;
   a cam in which a guide groove is formed to be inclined such that a portion of the cam pin is moved while being guided; and
   a damper rod including one side end portion connected to the cam and an other side end portion connected to the damper.

5. The air vent of claim 1, further comprising a damper device through which the damper is connected to one side end portion of the knob rotation shaft,
   wherein the middle portion of the knob rotation shaft to which the knob pin is coupled is formed in an angled shape, and the one side end portion of the knob rotation shaft to which the damper device is connected is formed in a circular shape.

6. The air vent of claim 1, wherein the duct comprises a rear duct and a front duct which are coupled to each other.

7. The air vent of claim 1, wherein a movement groove passes through the knob mount to allow the knob pin coupled to the knob to be laterally movable only within a certain range.

* * * * *